(12) United States Patent
Ragavan

(10) Patent No.: US 8,156,173 B2
(45) Date of Patent: Apr. 10, 2012

(54) SYNCHRONIZING MACHINES IN GROUPS

(75) Inventor: Srinivasa Ragavan, Bangalore (IN)

(73) Assignee: Novell, Inc., Provo, UT (US)

( * ) Notice: Subject to any disclaimer, the term of this patent is extended or adjusted under 35 U.S.C. 154(b) by 204 days.

(21) Appl. No.: 12/418,738

(22) Filed: Apr. 6, 2009

(65) Prior Publication Data
US 2010/0257244 A1    Oct. 7, 2010

(51) Int. Cl.
*G06F 15/16* (2006.01)
(52) U.S. Cl. .................. 709/201; 709/203; 709/208
(58) Field of Classification Search .................. 709/201, 709/203, 208
See application file for complete search history.

(56) References Cited

U.S. PATENT DOCUMENTS

| | | | |
|---|---|---|---|
| 7,315,791 B2 * | 1/2008 | Ilic et al. | 702/125 |
| 2007/0271395 A1 | 11/2007 | Libman | |
| 2008/0005280 A1 * | 1/2008 | Adams | 709/219 |
| 2008/0222159 A1 * | 9/2008 | Aranha et al. | 707/10 |
| 2008/0256557 A1 * | 10/2008 | Goft et al. | 719/320 |
| 2008/0263227 A1 * | 10/2008 | Roberts et al. | 709/248 |
| 2009/0125617 A1 * | 5/2009 | Klessig et al. | 709/223 |
| 2009/0203389 A1 * | 8/2009 | Bhat | 455/466 |
| 2010/0268844 A1 * | 10/2010 | Quinlan et al. | 709/238 |

* cited by examiner

*Primary Examiner* — Djenane Bayard
(74) *Attorney, Agent, or Firm* — Schwegman, Lundberg & Woessner, P.A.

(57) ABSTRACT

Apparatus, systems, and methods may operate to support synchronizing machines in groups. In some embodiments, synchronization is implemented by receiving an indication to activate a selected machine of a group of sync-aware machines connected to a subnet of a network, where each member of the group has information identifying all members of the group. Further activities include transmitting an activation message from the selected machine to the remainder of the group to notify the remainder that the selected machine is active, capturing a record of activities conducted at the selected machine while the selected machine is active, and transmitting information, based on the record, to the remainder of the group from the selected machine to synchronize results of the activities with the remainder after the selected machine becomes inactive. Additional apparatus, systems, and methods are disclosed.

22 Claims, 4 Drawing Sheets

SYNCHRONIZING MACHINES IN GROUPS

BACKGROUND

Many computer users today interact with more than one machine. For example, a single user might operate a desktop machine at work, a laptop machine when traveling, and a cellular telephone machine at home. While the applications themselves (e.g., email, browser, and word processing) may be shared across the machines, in many cases the data resulting from activities conducted on the machines when executing the applications is not.

For example, the user might be running a browser at home on his laptop to scan the Internet for articles relating to a work project, recording several bookmarks during the time the laptop is in use. Later, using the desktop computer at the office, the bookmarks may be lost, so that manual re-entry is required to add them into the browser application used at work. Similarly, the browsing history, logged at the laptop, may also be lost, and perhaps, impractical or impossible to recreate on the desktop. Additional difficulties may exist with respect to synchronizing instant message history, as well as other applications, across multiple machines.

SUMMARY

In various embodiments, apparatus, systems, and methods that support synchronizing machines in groups are provided. For example, in some embodiments, synchronization is implemented by receiving an indication to activate a selected machine within a group of sync-aware machines connected to a subnet of a network, where each member of the group has information identifying all members of the group. Further activities include transmitting an activation message from the selected machine to the remainder of the group to notify the remainder that the selected machine is active, capturing a record of activities conducted at the selected machine while the selected machine is active, and transmitting information, based on the record, to the remainder of the group from the selected machine to synchronize results of the activities with the remainder after the selected machine becomes inactive.

In some embodiments, operations may include receiving an activation message from a selected (active) machine at an inactive machine, the selected machine and the inactive machine forming part of a group of sync-aware machines connected to a subnet of a network. Each member of the group has information identifying all members of the group, and the activation message can be used to notify the inactive machine that the selected machine has become active. Further activities may include receiving information at the inactive machine from the selected machine based on a record of activities conducted at the selected machine while the selected machine is active. The information can be used to synchronize the results of the activities with the inactive machine after the selected machine becomes inactive. Additional embodiments are described, and along with the foregoing examples, will be set forth in detail below.

DETAILED DESCRIPTION

Figure 1:
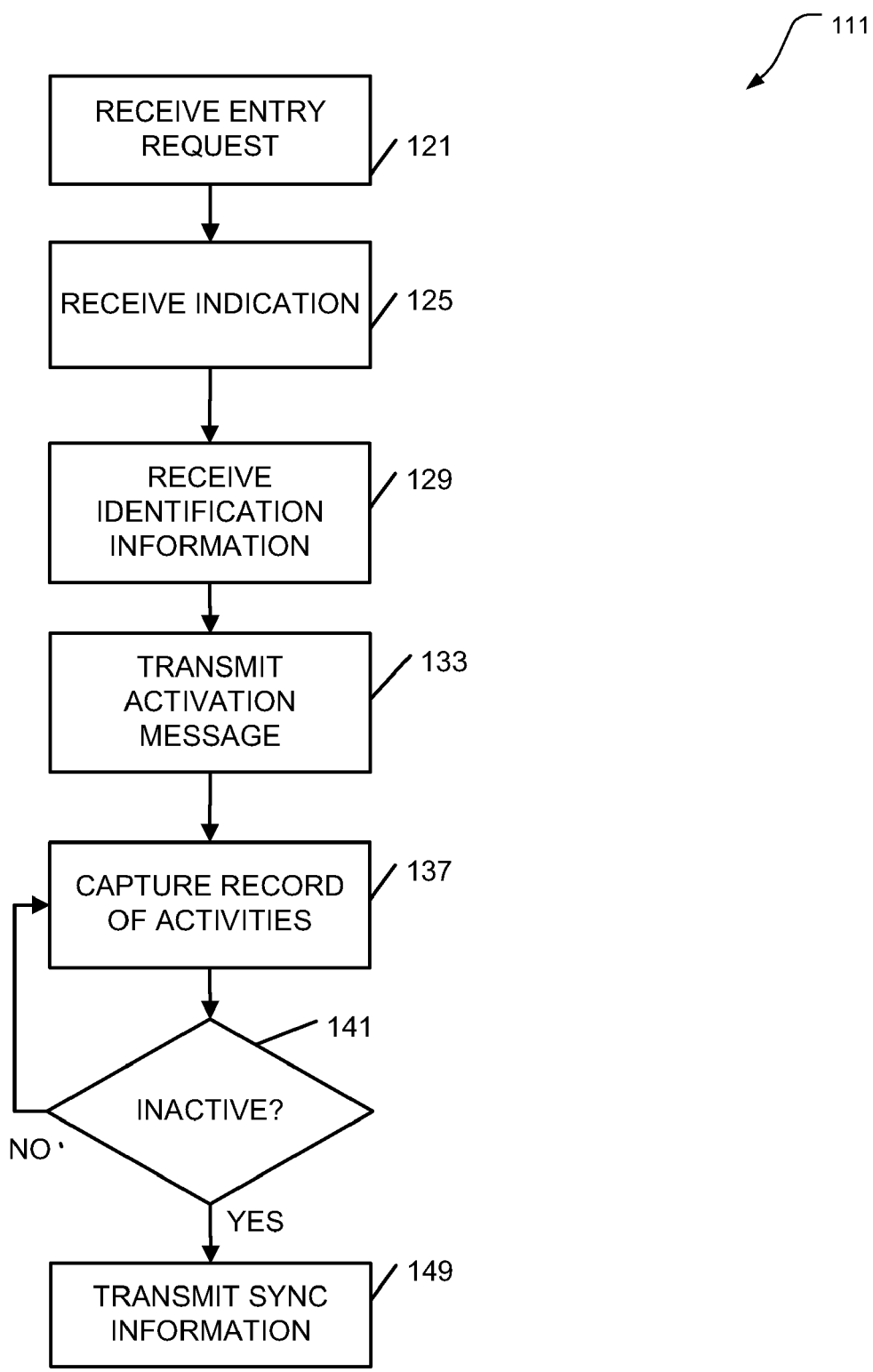
FIG. 1 is a flow diagram illustrating methods of synchronizing machines in groups according to various embodiments of the invention.

Some of the challenges described above may be addressed by implementing a synchronizing mechanism for multiple machines comprising a group, where each member in the group has information to identify the other members. For example, in some embodiments, machines can be paired at the application layer and applications, content, data, and user presence are synchronized. In this way, activities conducted at any one of the machines that involve applications, data, and notifications can be synchronized across environments and machines within the group. Thus, for example, when a user operates his laptop at home in the evening, his desktop at the office will have a complete record of whatever was accomplished on the laptop the evening before.

For the purposes of this document, the term "active machine" refers to a sync-aware machine in a group of sync-aware machines that has been activated due to the detected presence of a user operating that particular machine in the group. For example, detecting the movement of a mouse coupled to the machine can initiate transforming the machine into an active machine. Other ways to render the machine an active one include detecting the depression of keys on the keyboard, detecting the operation of a front-panel switch, detecting recognized voice commands at a microphone, detecting pressure on a touch screen, or detecting the activity of loading a CD-ROM into a disk drive, etc.

The term "inactive machine" refers to a sync-aware machine in a group of sync-aware machines where the presence of a user operating that machine has not been detected for some predefined time period, such as one second, two seconds, five seconds, ten seconds, etc. Thus, an inactive machine may experience a processor utilization of 100% (e.g., when running a complex equation solver application), and still be classified as an inactive machine because no user presence has been detected.

The term "sync-aware" as applied to a "sync-aware machine" means a processing platform (e.g., a node, virtual or physical) that has information sufficient to identify itself as a member of a specific group of machines, as well as information to identify all members of the same group of machines, each of which is also sync-aware. Further, a sync-aware machine has the capability, perhaps via a register or some other storage device, to carry information to identify its status to itself and to all other members of the group, as an active machine, or as an inactive machine.

In some embodiments, each machine in a sync-aware group has an agent operating an mDNS (multicast Domain Name Service) engine for service discovery within the subnet to which each machine in the group is coupled. When a user activates a machine in the group and requests that the activated machine be paired with an inactive machine, the mDNS agent may operate in service discovery mode, listening to packets broadcast within the subnet (e.g., to all machines coupled directly to the same router), to search for similar agents running on other machines in the group, pairing them in accordance with acceptance by the user. In some embodiments, the group of machines comprises one or more virtual machines.

Once machines in the group are paired, they may function so that it appears to a user operating one of the machines that multiple machines in the group are running together, with shared displays. For example, every minute or so, the agents running on multiple machines can negotiate over the presence of the user on the desktop. Using a heuristic algorithm, one of the agents can "win" the presence negotiation, which is then used to designate the active machine.

Once the agent determines at which machine the user presence is located, all notification from inactive machines can be forwarded to the active machine from the inactive machines via the agents running on the inactive machines. The display on the active machine can be used to present the notifications to the user directly, even though such notifications may be more pertinent to the inactive machine. Examples of such notifications include "battery low" for a laptop, or "critical updates available" for a personal digital assistant (PDA), each notification specific to the local status of one of the inactive machines.

Once the machines in a group are paired, application session sharing can be initiated. For example, if an instant messaging (IM) application is running on one machine, it can be logged in at other machines in the group as well. Then, when someone pings the user, the IM application at the active machine can display the appropriate message to the user. Similarly, at periodic intervals, web bookmarks and browsing history can be shared and merged across all machines in the group.

Email applications can also be integrated across desktops for all machines in the group. Inactive machines can initiate mail downloading and cache/status/data sharing with other inactive machines, as well as with the active machine. iFolder and/or DropBox services can be used to synchronize specific user folders/data. Password stores for IM/email can also be shared so that the user is not prompted for entry more than once (e.g., a single-sign-on procedure can be used across the machines in the group) with respect to active machine use and synchronization activity. Calendar tasks, music databases, and other application databases can also be shared and updated across paired machines.

In some embodiments, a default set of applications can be configured for sync-aware synchronization activity. In most embodiments, applications may be individually selected to participate, or not to participate, in the synchronization activities described herein.

Once a machine in a sync-aware group transitions from the active state to the inactive state, synchronization across the machines in the group may occur, perhaps by using the formerly-active machine to push new data to the inactive machines, so that the inactive machines can synchronize themselves to the state of the formerly-active machine. Thus, synchronization of the results of user activities from the active machine to inactive machines can occur during idle times of the active machine (e.g., when the active machine becomes inactive). Synchronization from the inactive machines to the active machine can occur in real time, or near-real time, such that notification events are communicated from the inactive machines to the active machine (and other inactive machines) as they occur.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating methods 111 of synchronizing machines in groups according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, synchronizing machines in groups is now discussed with reference to FIG. 1.

In some embodiments, as viewed from the perspective of an active machine, a processor-implemented method 111 that can be executed on one or more processors that perform the method may begin at block 121, where a pairing request is received at a selected machine to make the selected machine part of a sync-aware group of machines. The request may be received in response to activating a synchronization application on the selected machine, for example. Thus, the activity at block 121 may comprise receiving a request to enter the selected machine as a member of the group.

The method 111 may continue on to block 125 with receiving an indication to activate the selected machine as a member of a group of sync-aware machines connected to a subnet of a network, where each member of the group has information identifying all members of the group. The subnet can be defined as a lower level of an Internet protocol (IP) address, such as the subnetwork portion of the IP address. Thus, the subnet may be defined by a sub-level portion of an IP address. In some embodiments, the subnet is defined as the network comprising all machines coupled directly to the same router.

As noted previously, there are many ways in which a machine can be selected for activation. For example, the selected machine may become active in response to sensing the operation of a user input device, such as a keyboard, mouse, touch screen, or on/off switch. Thus, the activity at block 125 may comprise detecting manipulation of a user input device coupled to the selected machine.

The method 111 may continue on to block 129 with receiving identification information with respect to one or more machines that are members of the sync-aware group. For example, the active machine may operate to discover, or to be notified of the identity of the members in the group. Thus, the identity of members in the group can be discovered via the activities of a receiver comprising an mDNS monitoring engine, perhaps operating to receive the information by actively monitoring multicast DNS traffic on the subnet. In some embodiments, the activity at block 129 may comprise receiving information identifying all the members of the group, perhaps initiated independently by each member of the group that can identify itself and/or other machines in the group.

The method 111 may continue on to block 133 with transmitting an activation message from the selected machine to the remainder of the group to notify the remainder that the selected machine is active. The method 111 may also comprise, at block 137, capturing a record of activities conducted at the selected machine while the selected machine is active.

The record of activities can be made directly, such as by recording the activities themselves (e.g., keeping a record of keystrokes and the mouse location when a mouse click is detected). The record of activities can also be made indirectly, such as by recording the results of the activities (e.g., keeping a record of changed database content, passwords, or IM content). Thus, the activity at block 137 may comprise capturing a record of the activities directly and/or indirectly.

It should be understood then, that there are many ways of recording the activities. These include recording changed data values, or changed user input device conditions. Thus, the activity at block 137 may comprise recording data values and/or user input device conditions that change on the selected (active) machine as a result of the activities.

The activity at the selected machine can be monitored periodically (e.g., every minute) to determine whether the selected machine is still active, or whether it has become inactive. Thus, the method 111 may continue on to block 141 with determining that the selected machine is no longer active.

If the machine is still active, as determined at block 141, then the method 111 may operate to loop back to block 137, continuing to capture the record of activities on the selected machine. If the selected machine is no longer active, as determined at block 141, then the method 111 may continue on to block 149 with transmitting information, based on the record, to the remainder of the group from the selected machine to synchronize results of the activities with the remainder of the group after the selected machine becomes inactive. Other embodiments may be realized.

Figure 2:
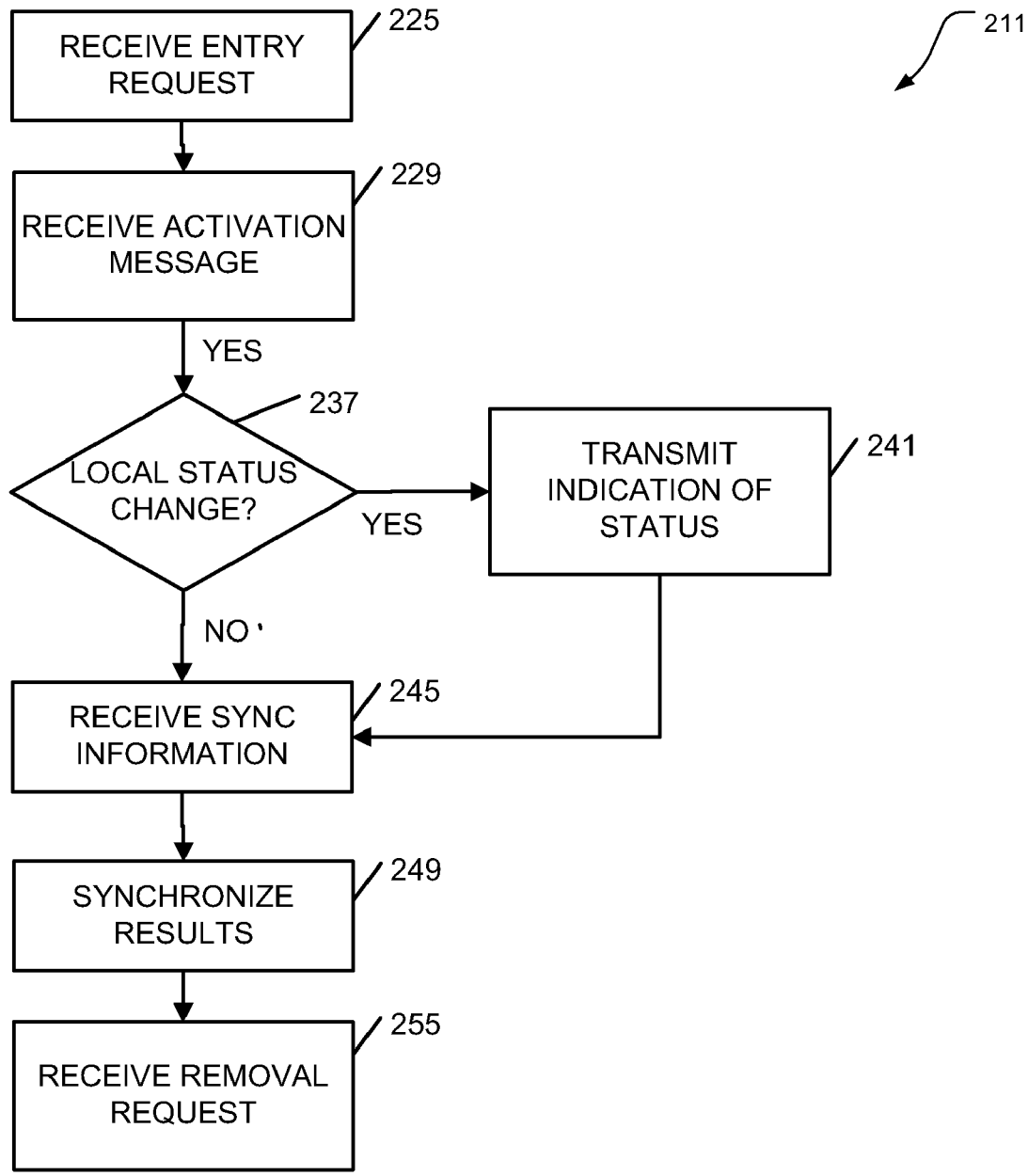
FIG. 2 is another flow diagram illustrating methods of synchronizing machines in groups according to various embodiments of the invention.

FIG. 2 is another flow diagram illustrating methods 211 of synchronizing machines in groups according to various embodiments of the invention. In this case, the methods 211 focus on the activities of an inactive machine, where a message is received identifying the active machine in the group, and then information is received by the inactive machine so that synchronization of the inactive machine to the active machine can occur. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, a processor-implemented method 211 that can be executed on one or more processors that perform the method may begin at block 225 with receiving a request at an inactive machine capable of becoming a member of a sync-aware group of machines, the request being to add the inactive machine as a member of the group. The request to add the inactive machine to the group may be received at the inactive machine, perhaps in response to a command delivered by a synchronization application on a machine selected to be an active machine. Once the inactive machine is added to the group, a message can be sent to the remainder of the group to notify the other members of the new addition to the membership.

The method 211 may continue on to block 229 with receiving an activation message from a selected (active) machine at an inactive machine, the selected machine and the inactive machine forming part of the group of sync-aware machines connected to a subnet of a network. Each member of the group has information identifying all members of the group. The activation message is used to notify the inactive machine that the selected machine is now active.

Inactive machines in the group can send indications of their local status to the active machine while it is active. Thus, once the activation message is sent to the remainder of the group, inactive members in the group may elect to notify the selected machine about status events local to the notifying machine (e.g., a low battery condition in a laptop that has been left unplugged). Thus, the method 211 may include determining whether a change in status has occurred at one of the inactive machines at block 237, perhaps by detecting the occurrence of a status change at the inactive machine, by the inactive machine, after receiving the activation message. If a change is detected, then the method 211 may continue on to block 241 with transmitting an indication of the status change as a local status notification message to the selected machine while the selected machine is active.

If no change in local status is detected at block 237, then the method 211 may go on to comprise, at block 245, receiving information at the inactive machine from the selected machine, based on a record of activities conducted at the selected machine while the selected machine is active.

The information received by the inactive machine can be used to synchronize results of the activities with the inactive machine after the selected machine becomes inactive. Synchronization may be accomplished in many ways.

For example, synchronization may occur when data processing operations are activated within applications on the various inactive machines in the group. Thus, the method 211 may comprise, at block 249, synchronizing the results by synchronizing application data processing operations based on the activities. Synchronization may also occur by synchronizing data that is stored in the various members of the group. Thus, the activity at block 249 may include additionally, or alternatively, synchronizing the results by synchronizing data stored in each member of the remainder of the group (i.e., the inactive machines in the group).

In addition to, or alternatively, synchronization may occur by using a single sign-on procedure for selected applications across the group. Thus, the activity at block 249 may comprise synchronizing the results using a single sign-on procedure for applications on the selected machine to gain access to applications on the inactive machine(s).

Pre-selected operational environments defined by a set of applications can also be used for synchronization operations. For example, email, telephone log records, and word processing application activities, but not IM records, can be selectively synchronized across all members of the group. Of course, many other combinations may be selected. Thus, the activities at block 249 may further comprise synchronizing the results associated with applications forming part of a pre-selected operational environment.

A request to remove the inactive machine from the group may be received at the inactive machine, perhaps in response to a command delivered by a synchronization application accessed by a processor on the inactive machine. Once the inactive machine is removed, a message can be sent to the remainder of the sync-aware group to notify all members of the reduction in membership. Thus, the method 211 continue on to block 255 to comprise receiving a request at the inactive machine to remove the inactive machine as a member of the group.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of synchronizing machines across groups shown in FIGS. 1 and 2 can be implemented in a computer-readable storage medium, where the methods are adapted to be executed by one or more processors. Further details of such embodiments will now be described.

Figure 3:
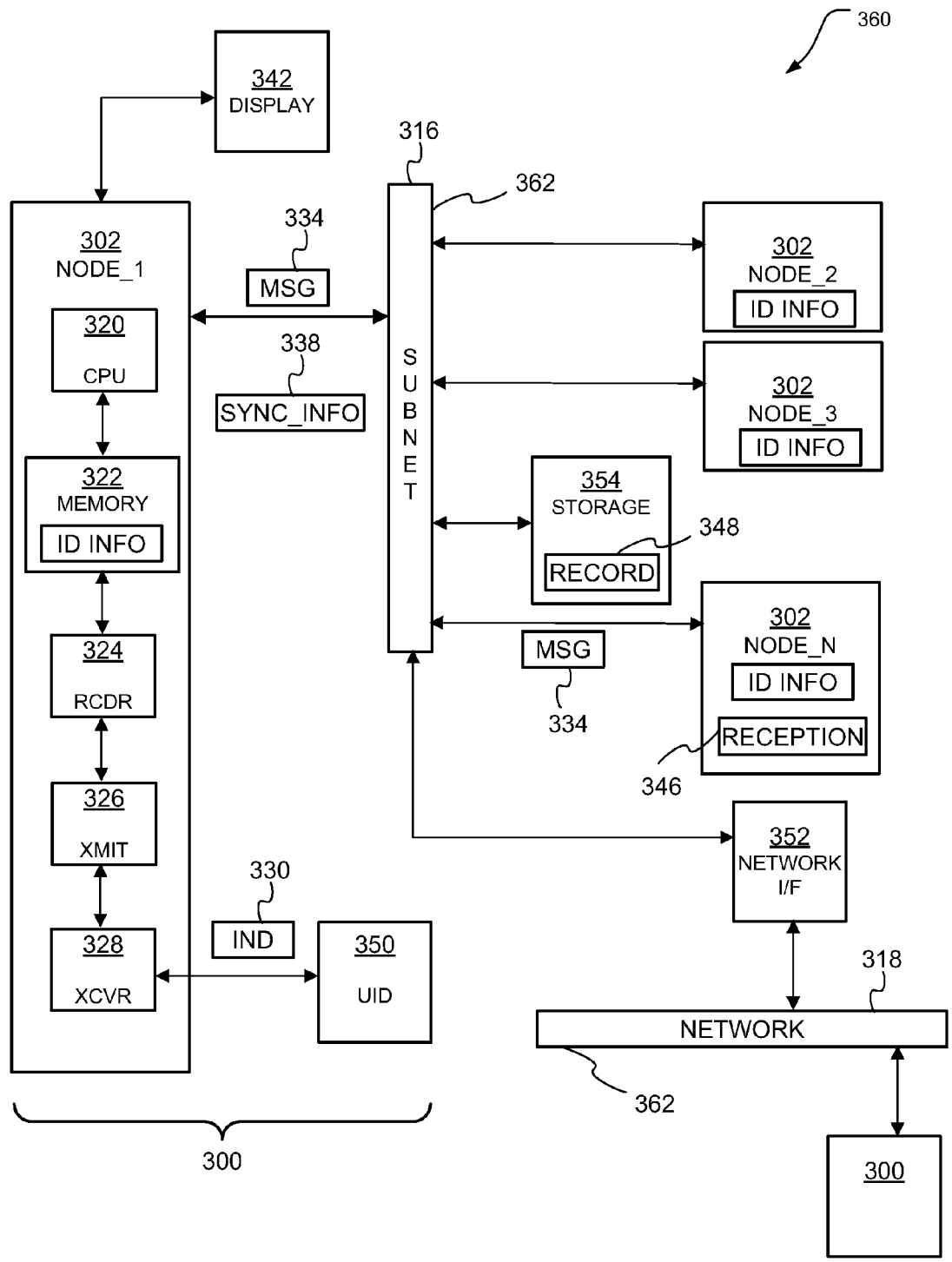
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to synchronize machines in groups may comprise one or more processing nodes 302, one or more processors 320, memory 322, a recorder 324, a transmission module 326, and a receiver 328.

The processing nodes 302 may comprise physical machines or virtual machines, or a mixture of both. The nodes 302 may also comprise networked entities, such servers and/or clients.

In some embodiments, then, an apparatus 300 may comprise a node 302 including a receiver 328 to receive an indication 330 that the node 302 is to be activated as a selected machine of a group of sync-aware machines (e.g., nodes 302) connected to a subnet 316 of a network 318, each member of the group having information ID INFO (e.g., media access control (MAC) addresses) identifying all members of the group.

The apparatus 300 may further comprise a transmission module 326 to transmit an activation message 334 from the selected machine (e.g., NODE_1) to the remainder of the group to notify the remainder that the selected machine is active. The transmission module 326 can also be used to transmit information 338, based on a record 348 of activities conducted at the selected machine while the selected machine is active, to the remainder of the group to synchronize results of the activities with the remainder of the group after the selected machine becomes inactive. The apparatus 300 might comprise a server, including a physical server or a virtual server, as well as a desktop computer, a laptop computer, a PDA, or a cellular telephone.

In some embodiments, the apparatus 300 comprises a recorder 324 to capture the record 348 of the activities. The recorder 324 may or may not be resident within the node 302 that represents the active machine.

A user input device 350, such as a keyboard, touch screen, trackball, switch, photosensitive device, imager, microphone, mouse, etc. may be used to provide an indication that the node is to be activated. Thus, the apparatus 300 may comprise a user input device 350 to provide the indication. Still further embodiments may be realized.

For example, it can be seen that a system 360 that operates to synchronize machines across groups may comprises multiple instances of the apparatus 300. The system 360 might also comprise a cluster of nodes 302, including physical and virtual nodes. Thus, in some embodiments, a system 360 may comprise a first node (e.g., NODE_1) in a group of sync-aware machines (e.g., nodes 302) connected to a subnet 316 of a network 318, the first node including a receiver 328 to receive an indication 330 that the first node is to be activated as a selected machine of the group.

The system 360 may further comprise a second node (e.g., NODE_N) in the group, each member of the group having information ID INFO identifying all members of the group, the second node comprising a reception module 346 to receive an activation message 334 from the selected machine (e.g., NODE_1, operating as an active machine) to notify the second node that the selected machine is active, the selected machine to transmit information 338, based on a record 348 of activities conducted at the selected machine while the selected machine is active, to the second node to synchronize results of the activities with the second node after the selected machine becomes inactive.

In some embodiments, the record 348 of activities can be stored on a network storage device 354, which may or may not form a portion of a node 302. Thus, the system 360 may comprise a storage unit 354 coupled to the subnet 316 to store the record 348.

The first node, operating as the selected machine, may exist as a device embedded within another structure (e.g., as an embedded device), or as a regular desktop or laptop computer that includes a display 342 to show the activities conducted while the selected machine is active. Thus, the system 360 may also comprise a display 342 coupled to the first node to display visible indications of the activities.

The apparatus 300 and system 360 may be implemented in a machine-accessible and readable medium that is operational over one or more networks (e.g., included in communication paths 362). The networks may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
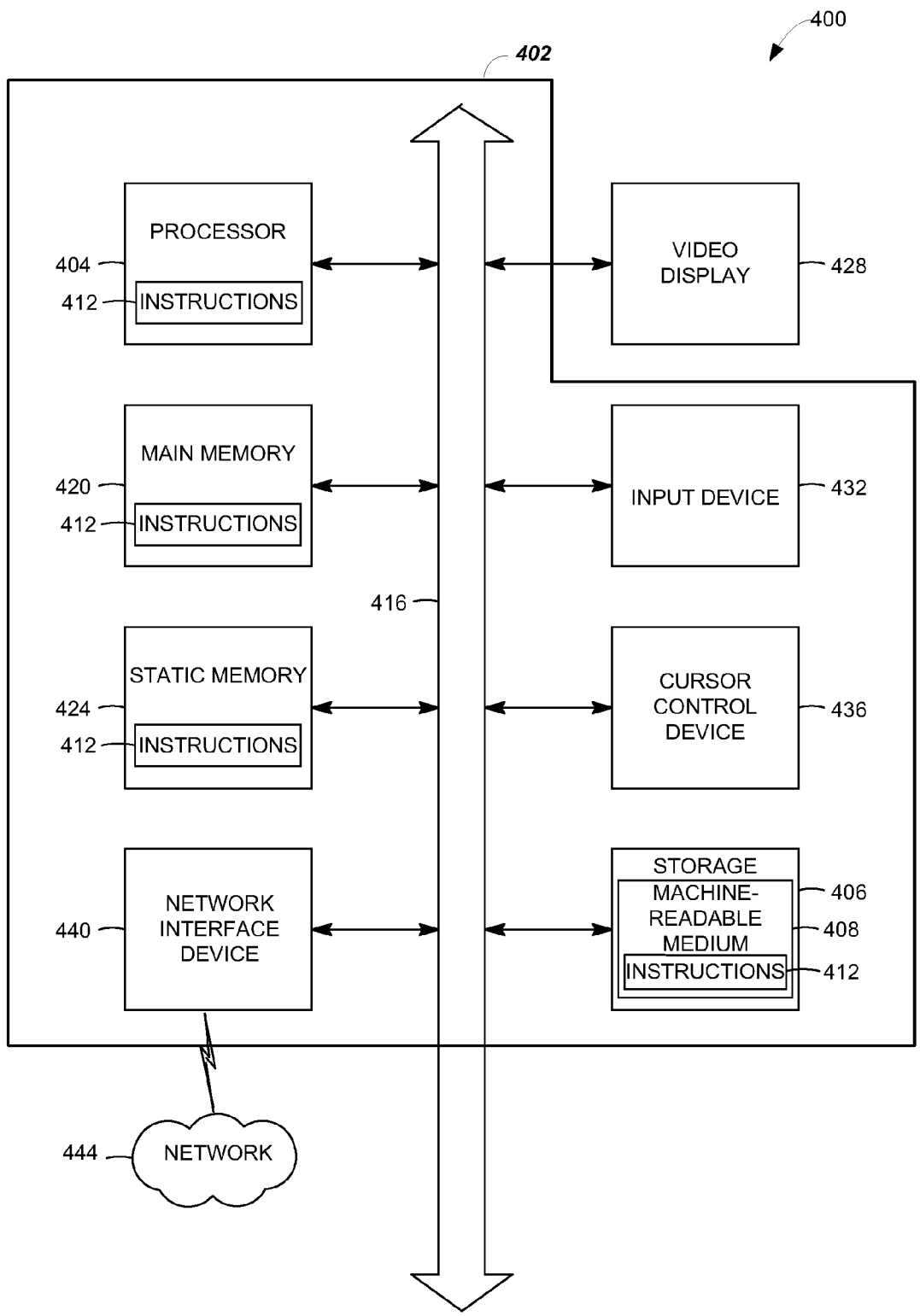
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make application access more efficient across applications deployed within a sync-aware group of machines. More efficient allocation of processing resources, and increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a node including a receiver to receive an indication that the node is to be activated as a selected machine of a group of sync-aware machines connected to a subnet of a network, each member of the group having information identifying all members of the group, wherein the information identifying all the members of the group is received by monitoring multicast domain name service traffic on the subnet; and
a transmission module to transmit an activation message from the selected machine to a remainder of the group to notify the remainder that the selected machine is active, and to transmit information, based on a record of activities conducted at the selected machine while the selected machine is active, to the remainder to synchronize results of the activities with the remainder once the selected machine becomes inactive.

2. The apparatus of claim 1, further comprising:
a recorder to capture the record of the activities.

3. The apparatus of claim 1, further comprising:
a user input device to provide the indication.

4. A system, comprising:
a first node in a group of sync-aware machines connected to a subnet of a network, the first node including a receiver to receive an indication that the first node is to be activated as a selected machine of the group; and
a second node in the group, each member of the group having information identifying all members of the group, the second node comprising a reception module to receive an activation message from the selected machine to notify the second node that the selected machine is active, the selected machine to transmit information, based on a record of activities conducted at the selected machine while the selected machine is active, to the second node to synchronize results of the activities with the second node once the selected machine becomes inactive, wherein the information identifying all the members of the group is received by monitoring multicast domain name service traffic on the subnet.

5. The system of claim 4, further comprising:
a storage unit coupled to the subnet to store the record.

6. The system of claim 4, further comprising:
a display coupled to the first node to display visible indications of the activities.

7. A processor-implemented method to execute on one or more processors that perform the method, comprising:
receiving an indication to activate a selected machine of a group of sync-aware machines connected to a subnet of a network, each member of the group having information identifying all members of the group, wherein the information identifying all the members of the group is received by monitoring multicast domain name service traffic on the subnet;
transmitting an activation message from the selected machine to a remainder of the group to notify the remainder that the selected machine is active;

capturing a record of activities conducted at the selected machine while the selected machine is active; and transmitting information, based on the record, to the remainder from the selected machine to synchronize results of the activities with the remainder once the selected machine becomes inactive.

8. The method of claim 7, wherein the receiving comprises:
detecting manipulation of a user input device coupled to the selected machine.

9. The method of claim 7, wherein the subnet is defined by a sub-level portion of an Internet protocol address.

10. The method of claim 7, wherein capturing the record comprises:
recording at least one of data values or user input device conditions that change on the selected machine as a result of the activities.

11. The method of claim 7, wherein capturing the record comprises:
capturing the record of the activities at least one of directly or indirectly.

12. The method of claim 7, further comprising:
receiving the information identifying all the members of the group.

13. The method of claim 7, further comprising:
determining that the selected machine is no longer active.

14. The method of claim 7, further comprising:
receiving a request to enter the selected machine as a member of the group.

15. A processor-implemented method to execute on one or more processors that perform the method, comprising:
receiving an activation message from a selected machine at an inactive machine, the selected machine and the inactive machine forming part of a group of sync-aware machines connected to a subnet of a network, each member of the group having information identifying all members of the group, the activation message to notify the inactive machine that the selected machine is active, wherein the information identifying all the members of the group is received by monitoring multicast domain name service traffic on the subnet; and receiving information at the inactive machine from the selected machine, based on a record of activities conducted at the selected machine while the selected machine is active, to synchronize results of the activities with the inactive machine once the selected machine becomes inactive.

16. The method of claim 15, further comprising:
synchronizing the results by synchronizing application data processing operations based on the activities.

17. The method of claim 15, further comprising:
synchronizing the results by synchronizing data stored in each member of a remainder of the group, including the inactive machine.

18. The method of claim 15, further comprising:
detecting occurrence of a status change at the inactive machine, by the inactive machine, after receiving the activation message; and transmitting an indication of the status change as a local status notification message to the selected machine while the selected machine is active.

19. The method of claim 15, further comprising:
synchronizing the results using a single sign-on procedure for applications on the selected machine to gain access to applications on the inactive machine.

20. The method of claim 15, further comprising:
synchronizing the results associated with applications forming part of a pre-selected operational environment.

21. The method of claim 15, further comprising:
receiving a request at the inactive machine to add the inactive machine as a member of the group.

22. The method of claim 15, further comprising:
receiving a request at the inactive machine to remove the inactive machine as a member of the group.

* * * * *